United States Patent

[11] 3,619,438

| [72] | Inventor | David R. Cistone<br>Lancaster, Pa. |
|---|---|---|
| [21] | Appl. No. | 863,738 |
| [22] | Filed | Aug. 19, 1969 |
| [45] | Patented | Nov. 9, 1971 |
| [73] | Assignee | Armstrong Cork Company<br>Lancaster, Pa.<br>Continuation-in-part of application Ser. No. 614,602, Feb. 8, 1967, now abandoned. |

[54] PROCESS FOR FOAMING OF A MOLDED ARTICLE IN A POROUS MOLD
1 Claim, 1 Drawing Fig.

[52] U.S. Cl. .................................................. 264/45,
18/5 P, 264/53
[51] Int. Cl. ............................................... B29d 27/00
[50] Field of Search ........................................ 264/248,
50, 53, 51, 45, 48

[56] References Cited
UNITED STATES PATENTS

| 2,715,747 | 8/1955 | Lindemann | 264/54 |
| 3,436,445 | 4/1969 | Brunner | 264/50 |
| 2,848,739 | 8/1958 | Henning | 264/47 X |
| 3,069,725 | 12/1962 | Root | 264/248 X |
| 3,300,552 | 1/1967 | Shelby | 264/53 X |
| 3,316,335 | 4/1967 | Snella | 264/50 |
| 3,389,199 | 6/1968 | Bushnell | 264/53 |
| 3,466,705 | 9/1969 | Richie | 264/50 X |

*Primary Examiner*—Julius Frome
*Assistant Examiner*—Paul A. Leipold
*Attorney*—Clifford B. Price ABSTRACT: A process for forming and selectively foaming plastic articles comprising filling a mold with particulate polystyrene or polypropylene resin converting the resin to its plastic state by heat and pressure, passing a liquid volatile fluorocarbon foaming agent through a porous section of the mold cavity to permit permeation of the resin by the foaming agent, and then releasing the molding pressure to permit foaming. Only the portion of the article corresponding to the location of the porous mold areas is foamed.

PATENTED NOV 9 1971  3,619,438
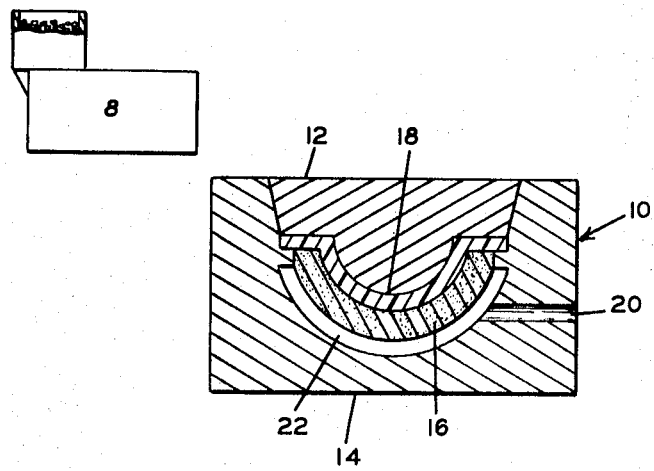
INVENTOR
DAVID R. CISTONE
BY Clifford B. Price
ATTORNEY

PROCESS FOR FOAMING OF A MOLDED ARTICLE IN A POROUS MOLD

CROSS-REFERENCE TO RELATED APPLICATION

This application is a continuation-in-part application from Ser. No. 614,602, filed Feb. 8, 1967, and now abandoned.

BACKGROUND OF THE INVENTION

1. Field of the Invention

The invention relates to the molding of plastic foams and more particularly to a process for molding plastic foams wherein the Freon foaming agent or similar blowing agents are not premixed with the plastic before it is charged to the mold.

DESCRIPTION OF THE PRIOR ART

The premixing of Freon with a plastic before the plastic is charged to the mold is a known process in the art as shown in Pat. No. 3,111,365. Pat. No. 3,015,851 discloses that it is old to use a porous die for the foaming of a molded article, but the foaming or blowing agent is premixed with the plastic before it is charged to the die.

SUMMARY OF THE INVENTION

The use of Freon and other agents as foaming agents in the foaming of a molded article has been limited by the inability to incorporate these elements in a material in which they are insoluble. The molding temperatures used are above the boiling point for Freon and, since it is in an insoluble state, it will turn to a gas before the desired time and result in an uncontrolled gassing. The method of this application overcomes the above problem since it provides for the charging of the mold with Freon only at the point during the molding cycle when it is desirable to have the Freon vaporize. This is accomplished by using a porous mold and applying the Freon under pressure through the mold only at that time in the molding cycle when it is desirous to have the Freon present.

BRIEF DESCRIPTION OF THE DRAWING

The figure is a sectional view of a closed mold assembly

DESCRIPTION OF THE PREFERRED EMBODIMENT

A conventional extruder 8 prepares the material for the mold. The mold assembly 10 is composed of two parts, an upper mold section 12 and a lower mold section 14. The lower mold section has a porous wall structure 16 surrounding all or a portion of the lower mold cavity. The molded article 18 is foamed in position in the cavity formed by the lower mold section 14 and the corresponding cavity-defining wall of the upper mold section 12. A channel 20 provides a passageway into the lower mold 14 and joins a passageway 22 disposed adjacent the porous section 16 of the lower mold cavity.

In operation a Freon charge under pressure passes through passageway 20 and 22, then through the porous section 16 into the mold cavity containing the plastic state materials which will form the foamed plastic article 18. The Freon charge is placed in the cavity only at that time during the molding cycle when it is desired to permit the foaming of the plastic material. This point is just prior to the releasing of the mold. Since the Freon is not available in the mold cavity until it is needed, there will be no premature vaporization of the Freon with a resulting uncontrolled gassing.

Prior to the time that the process of this application was developed, the type of plastic material used was limited by the boiling point of the foaming agent. The solid particles of thermoplastic material were heated and subjected to pressure to convert the solid material to a plastic state. The above process has been carried out with the mold pressures between 500 and 2,000 p.s.i. and the material temperatures in the range of 350° to 500° F. The foaming agent was normally added to the plastic state material just before it was charged to the mold. If the temperature of the thermoplastic material was above the boiling point of the foaming agent, uncontrolled gassing occurred.

With the new process there is no premixing of the foaming agent with the plastic state thermoplastic material before the mold is charged with material. The foaming agent is applied to the mold after it is charged and closed, and the agent then permeates the walls of the formed article at those points where the porous mold section exists. Releasing of the mold then permits foaming. This obviously means the releasing of pressure on the material now containing the Freon. The Freon then expands and causes foaming. Consequently, the new process permits selective foaming of only certain areas or foaming of the total article and prevents uncontrolled gassing. The particular plastic materials used to form the molded articles are of the well-known types similar to those set forth in the above-mentioned patents. One material which was used was polystyrene, which is specifically mentioned as the material in Pat. No. 3,015,851. Another similar type of material used was a polypropylene. The foaming agent, preferably in liquid form, specifically described herein is Freon; however, the claimed method is applicable to other foaming agents which, with the conventional molding techniques, would provide uncontrolled gassing. The volatile fluorocarbons which have been used to carry out this particular process are Freon 114, which is used for the foaming of polystyrene, and Freon 114, Freon 11, Freon 112 and Freon 113, which have been used with polypropylene. Freon 11 is trichloromonofluoromethane ($CCl_3F$), Freon 112 is tetrachlorodifluoroethane ($CCl_2F$—$CCl_2F$), Freon 113 is trichlorotrifluoroethane ($C_2Cl_3F_3$) and Freon 114 is dichlorotetrafluoroethane ($C_2Cl_2F_4$).

What is claimed is:

1. The process for forming and selectively foaming plastic articles, said process comprising the steps of: filling a mold cavity with a foamable thermoplastic synthetic resinous material selected from the group consisting of polystyrene and polypropylene which is in solid particulate form and includes no foaming agent therefor, converting the resinous material to its plastic state by heat and pressure at a temperature above the boiling point of a subsequently used foaming agent therefor, passing a liquid form, volatile fluorocarbon foaming agent through a porous section of the mold cavity to charge a selected surface area thereof while the thermoplastic material is in its above plastic state to permit permeation of the thermoplastic material by said foaming agent, and then releasing the molding pressure to permit foaming whereby foaming of only the portion of the molded article corresponding in location to the foaming agent-charged surface area of the mold is achieved and vaporization of the foaming agent has been controlled.

* * * * *